United States Patent
Siegfriedsen

(10) Patent No.: US 10,487,803 B2
(45) Date of Patent: Nov. 26, 2019

(54) OFFSHORE WIND FARM

(71) Applicant: Aerodyn Consulting Singapore pte ltd, Singapore (SG)

(72) Inventor: Sonke Siegfriedsen, Rendsburg (DE)

(73) Assignee: Aerodyn Consulting Singapore PTE LTD, Singapore (SG)

( * ) Notice: Subject to any disclaimer, the term of this patent is extended or adjusted under 35 U.S.C. 154(b) by 0 days.

(21) Appl. No.: 15/774,353

(22) PCT Filed: Sep. 30, 2016

(86) PCT No.: PCT/DE2016/100459
§ 371 (c)(1),
(2) Date: May 8, 2018

(87) PCT Pub. No.: WO2017/097286
PCT Pub. Date: Jun. 15, 2017

(65) Prior Publication Data
US 2019/0024635 A1 Jan. 24, 2019

(30) Foreign Application Priority Data
Dec. 8, 2015 (DE) .................. 10 2015 121 371

(51) Int. Cl.
*F03D 13/25* (2016.01)
*F03D 13/20* (2016.01)

(52) U.S. Cl.
CPC .............. *F03D 13/25* (2016.05); *F03D 13/22* (2016.05); *F05B 2240/95* (2013.01)

(58) Field of Classification Search
CPC ...... F03D 13/25; F03D 13/22; F05B 2240/95; Y02E 10/725; Y02E 10/727
See application file for complete search history.

(56) References Cited

U.S. PATENT DOCUMENTS 7,075,189 B2 * 7/2006 Heronemus ............ B63B 1/047
290/44
9,003,631 B2 * 4/2015 Yamamoto ................ F03D 1/04
29/525.01
(Continued)

FOREIGN PATENT DOCUMENTS

DE  202013100004  3/2013
DE  102012007613  10/2013
(Continued)

*Primary Examiner* — Tulsidas C Patel
*Assistant Examiner* — Joseph Ortega
(74) *Attorney, Agent, or Firm* — Diederiks & Whitelaw, PLC.

(57) ABSTRACT

An offshore wind farm with a plurality of foundation elements which are arranged so as to form the corners of a plurality of parquetted hexagons and with a plurality of floating offshore wind turbines. Each floating offshore wind turbine within a hexagon is connected to the foundation elements which form the hexagon. The invention is characterized in that the floating offshore wind turbines are connected to the foundation elements by means of connection means designed as a chain and/or a cable or a combination of a chain and a cable. The connection means have a length which allows the offshore wind turbines to drift within a circular area with a radius of up to 10% of the hexagon circumradii about the respective hexagon center.

20 Claims, 4 Drawing Sheets

(56) References Cited

U.S. PATENT DOCUMENTS

| | | | | |
|---|---|---|---|---|
| 9,347,425 B2* | 5/2016 | Wright | | F03B 13/14 |
| 9,751,602 B2* | 9/2017 | Nakamura | | F03B 13/16 |
| 10,309,374 B2* | 6/2019 | Nelson | | F03D 9/25 |
| 2006/0171798 A1* | 8/2006 | Yamamoto | | F03D 1/02 |
| | | | | 415/4.5 |
| 2008/0036213 A1* | 2/2008 | Storbekk | | F03B 13/186 |
| | | | | 290/53 |
| 2010/0219645 A1* | 9/2010 | Yamamoto | | F03D 1/04 |
| | | | | 290/55 |
| 2010/0230965 A1* | 9/2010 | Pitre | | F03B 13/186 |
| | | | | 290/42 |
| 2010/0278630 A1* | 11/2010 | Yamamoto | | F03D 1/02 |
| | | | | 415/60 |
| 2011/0215650 A1* | 9/2011 | Slocum | | F03B 13/06 |
| | | | | 307/72 |
| 2012/0114501 A1* | 5/2012 | Rutherford | | F03D 1/04 |
| | | | | 416/244 R |
| 2012/0139255 A1* | 6/2012 | Zhu | | F03D 13/25 |
| | | | | 290/55 |
| 2012/0305051 A1* | 12/2012 | Kokotov | | B63B 21/50 |
| | | | | 136/246 |
| 2012/0328437 A1* | 12/2012 | Tunbjer | | B63B 35/4413 |
| | | | | 416/85 |
| 2013/0152839 A1* | 6/2013 | Graf | | B63B 21/50 |
| | | | | 114/125 |
| 2013/0224020 A1* | 8/2013 | Dagher | | B63B 5/14 |
| | | | | 416/84 |
| 2014/0044541 A1* | 2/2014 | Dupin De La Gueriviere | | |
| | | | | B63B 21/50 |
| | | | | 416/1 |
| 2014/0311058 A1* | 10/2014 | Molins Borrell | | E02D 27/425 |
| | | | | 52/125.3 |
| 2014/0322012 A1* | 10/2014 | Steinberg | | F03D 3/067 |
| | | | | 416/17 |
| 2015/0252791 A1* | 9/2015 | Taub | | B63B 21/50 |
| | | | | 405/205 |
| 2015/0259050 A1* | 9/2015 | Tunbjer | | B63B 35/44 |
| | | | | 114/266 |
| 2016/0059938 A1* | 3/2016 | Momayez | | H02S 10/40 |
| 2016/0230746 A1* | 8/2016 | Dagher | | F03D 13/25 |
| 2016/0272284 A1* | 9/2016 | Grossmann | | B63B 35/44 |
| 2016/0333858 A1* | 11/2016 | Pitre | | F03B 13/186 |
| 2017/0166286 A1* | 6/2017 | Nakamura | | B63B 21/50 |
| 2017/0191467 A1* | 7/2017 | Miller | | F03D 9/10 |
| 2017/0218919 A1* | 8/2017 | Wong | | F03D 7/0204 |
| 2017/0241408 A1* | 8/2017 | Von Heland | | F03D 7/0204 |
| 2017/0356423 A1* | 12/2017 | Galdos Tobalina | | B63B 35/44 |
| 2019/0277255 A1* | 9/2019 | Nielsen | | F03D 9/30 |

FOREIGN PATENT DOCUMENTS

| | | | | |
|---|---|---|---|---|
| EP | 3168131 A4 * | 4/2018 | | B63B 21/50 |
| JP | 2004176626 | 6/2004 | | |
| WO | 2008047011 | 4/2008 | | |

* cited by examiner

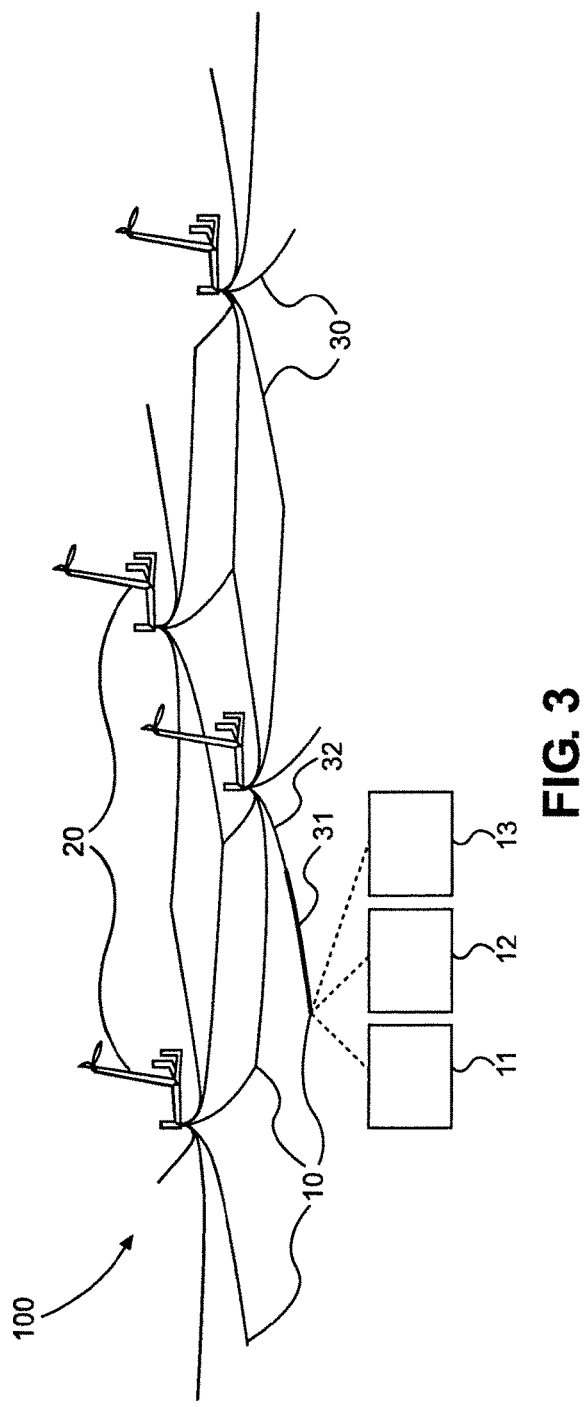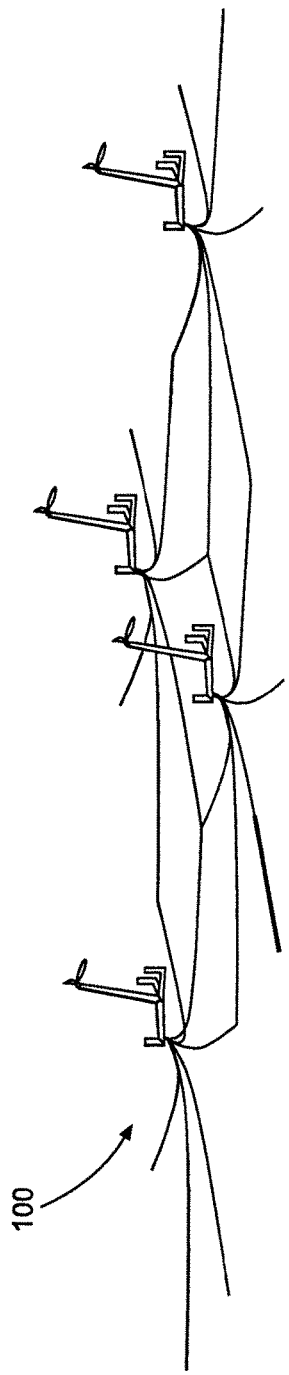

OFFSHORE WIND FARM

BACKGROUND OF THE INVENTION

The invention relates to an offshore wind farm having a plurality of foundation elements that are situated to form the corners of a plurality of tiled hexagons, and having a plurality of floating offshore wind power plants, wherein in each case one floating offshore wind power plant within each hexagon is connected to the foundation elements forming the hexagon.

The invention further relates to a method for setting up an offshore wind farm having the above-mentioned features.

An arrangement for a wind farm made up of floating offshore wind power plants is known from DE 10 2012 007 613 A1, having tiling from a plurality of hexagonally arranged foundation elements, each floating wind power plant being anchored within the outline of a hexagon.

The object of this known technical approach was to provide a vibration-damping attachment of the floating wind power plants to offshore foundation elements in order to counteract horizontal and vertical shifts of the facilities by means of what is referred to in the patent application as a customary "soft fixing."

The approach in DE 10 2012 007 613 A1 provides for fixing each floating wind power plant of a wind farm by means of a plurality of diagonal tensile lines and optionally also by means of a plurality of vertical anchor lines in each case, in such a way that "the tethering of the object is complete in all three dimensions, in a manner of speaking."

Either a solid framework or solid linked chains that are held under tension by means of winches is/are provided as tensile elements or anchor lines. The floating offshore wind power plants are thus rigidly anchored in the midpoint of a hexagon, with the diagonal tensile lines of adjoining wind power plants anchored on foundation elements that are jointly used by the adjoining wind power plants for anchoring.

A disadvantage of this type of wind farm, however, is the high level of effort in setting up the wind farm and its equipment using diagonal tensile cords, whose pretensioning must be precisely defined and maintained so that the wind power plants may be installed in a fixed manner and free of vibration.

However, the rigid fixing also has the disadvantage that this type of wind farm is subject to high wear and thus a high level of maintenance effort with regard to its structures used for the anchoring. In addition, the cable winches or connecting means that connect the framework to the wind power plant and/or to the foundation are subjected to a continuous high dynamic load, and therefore require routine monitoring and maintenance.

Further anchoring systems for floating wind power plants are known from DE 20 2013 100 004 U1 and JP 2004/176626 A.

The object of the invention, therefore, is to provide a wind farm that may be easily, quickly, and cost-effectively installed, and that has a long service life with regard to its foundation elements.

SUMMARY OF THE INVENTION

This object is achieved according to the invention by the wind farm having the features of claim 1. The subclaims set forth advantageous embodiments of the invention.

A basic concept of the invention is to provide a wind farm having foundation elements that are jointly used by multiple floating wind power plants, wherein the foundation elements are hexagonally arranged, and the wind power plants are vertically and horizontally movable within this hexagonal structure.

This is made possible on the one hand by the use of foundation elements which are not only precisely positioned, but which are also able to absorb horizontal loads and vertical loads. In contrast to conventional anchors, which are neither precisely positioned nor able to absorb vertical loads, precise positioning of the foundation elements according to the invention in the form of tiled regular hexagons is possible, which results in optimal load distribution on the foundation elements.

On the other hand, a connection of the floating wind power plants to the foundation elements by means of chains and/or cables or a combination of chains and cables on average reduces the dynamic loads acting in each case on a foundation element, in that the connecting means in the starting state—i.e., with a floating wind power plant situated in the midpoint of a hexagon—are not tensioned, and instead have a length that allows a horizontal and vertical movement of the floating wind power plant to and from the midpoint of the hexagon. Thus, the connecting means sag in the starting state.

If a facility drifts, only the connecting means situated opposite the drift direction (or only a few connecting means situated in this direction) is/are tensioned, and the connecting means situated in the drift direction remain untensioned, i.e., sag.

Due to the precise arrangement of the foundation elements, which can be carried out not only quickly, but, as a result of the tiling, also in a material-saving manner, and due to a connection of the floating wind power plants to the foundation elements by means of chains and/or cables or a combination of chains and cables, a system of wind farms that is relatively uncomplicated compared to conventional methods, and which may also proceed in multiple steps, is possible.

An offshore wind farm having a plurality of foundation elements which form the corners of a plurality of tiled hexagons, and having a plurality of floating offshore wind power plants, is thus provided according to the invention, wherein in each case one floating offshore wind power plant within each hexagon is connected to the foundation elements forming the hexagon, wherein the floating offshore wind power plants are connected to the foundation elements via connecting means designed as chains and/or cables or a combination of chains and cables, and the connecting means have a length that allows drifting of the offshore wind power plants within a circular area having a radius of up to 10% of the hexagon circumradii about the particular hexagon midpoint.

The foundation elements are configured in such a way that they are able to withstand horizontal tensile loads as well as vertical tensile loads. The foundation elements are preferably selected from the group of foundation elements comprising foundation piles, gravity foundations, and suction bucket foundations.

The use of suction bucket foundations is particularly preferred for the installation of wind farms in the area of homogeneous beds of bodies of water. The suction bucket foundation is made up of a steel cylinder, open at the bottom, which is set on the bed of the body of water and subsequently pumped out. The negative pressure thus created in the interior of the foundation draws the suction bucket foundation into the bed, the bed material inside the cylinder supporting the suction bucket foundation and anchoring it in the bed of the body of water.

Suction bucket foundations may be installed with precise positioning and in an easy and rapid manner, and may also be easily removed by lifting the foundation from the bed of the body of water by pumping air into the cylinder.

As a result of the cables or chains having a length that is greater than the distance between the foundation element of a hexagon and the attachment point of the cable or the chain to the offshore wind power plant, situated within the hexagon on the water surface, when it is positioned at the midpoint of the hexagon, the connecting means sag, and in particular a section of the connecting means that is closer to the foundation element rests on the bed of the body of water.

When the length of cable or chain is tensioned, the foundation elements completely limit the freedom of movement of the wind power plant on the water surface as an absolute limit.

According to the invention, this limit is situated in a perimeter having a maximum radius of 10% of the hexagon circumradii about the midpoint of the particular hexagon.

It is not necessary to cut the chains or cables exactly to length, which would be required for bracing the wind power plants, so that the invention allows rapid, simple operations during the installation of such a wind farm.

The connecting means, designed as a combination of chains and cables, are preferably connected with their chain portion to the foundation elements, and are connected with their cable portion to the floating offshore wind power plant (optionally by means of a buoy).

The wind power plants are designed with a floating foundation, the connecting means being connected in each case to the wind power plant, preferably to its foundation, at a single peripheral point. In particular, the wind power plants are designed in such a way that they automatically orient according to the wind direction and drift in the wind direction.

For setting up such a wind farm having the above-mentioned features, according to the invention a method for setting up such an offshore wind farm is also provided, which has a very efficient design with regard to the level of effort and the required setup time. With the method, it is also possible, depending on the weather conditions, to carry out individual steps and to postpone the other steps to a later time.

The method according to the invention for setting up an offshore wind farm provides the following steps: Introducing a plurality of foundation elements into the bed of a body of water in such a way that the foundation elements form the corners of a plurality of tiled hexagons; connecting the foundation elements, which in each case form a hexagon, to a shared buoy by means of a plurality of connecting means, which are formed in each case as chains and/or cables or a combination of chains and cables; and connecting the connecting means, fastened to the buoy, to a floating wind power plant.

The introduction of the foundation elements to form the regular hexagons advantageously takes place at a position that is predetermined by means of a positioning system, for example Naystar GPS, DGPS, or AGPS.

One particularly advantageous design of the method is achieved when a buoy is designed as a coupling for connecting the cables or chains to the floating wind power plant. In this embodiment, it is necessary only to connect the buoy to the floating wind power plant, so that the cables or chains fastened to the buoy do not have to be detached from the buoy and connected to the wind power plant in an additional step.

In addition, the offshore wind power plant must of course be connected to an underwater cable. The underwater cable, the same as for the cables or chains described above, may be connected to the buoy before the wind power plant is brought to the wind farm.

If the buoy, as stated above, is designed as a mechanical coupling or has a coupling element for connection to the floating wind power plant, it is also possible to design the buoy as an electrical coupling for connecting the underwater cable to the electrical equipment of the wind power plant. The mechanical connection and the electrical connection may thus take place in one step.

BRIEF DESCRIPTION OF THE FIGURES

The invention is explained in greater detail below with reference to one exemplary embodiment having a particularly preferred design, illustrated in the appended drawings, which show the following:

FIG. 3 shows a detail of a wind farm according to the invention with several adjacently arranged floating wind power plants in the rest position; and FIG. 4 shows the detail of the wind farm from FIG. 3, under load with a wind direction from the left.

DETAILED DESCRIPTION OF THE PREFERRED EMBODIMENTS

Figure 1:
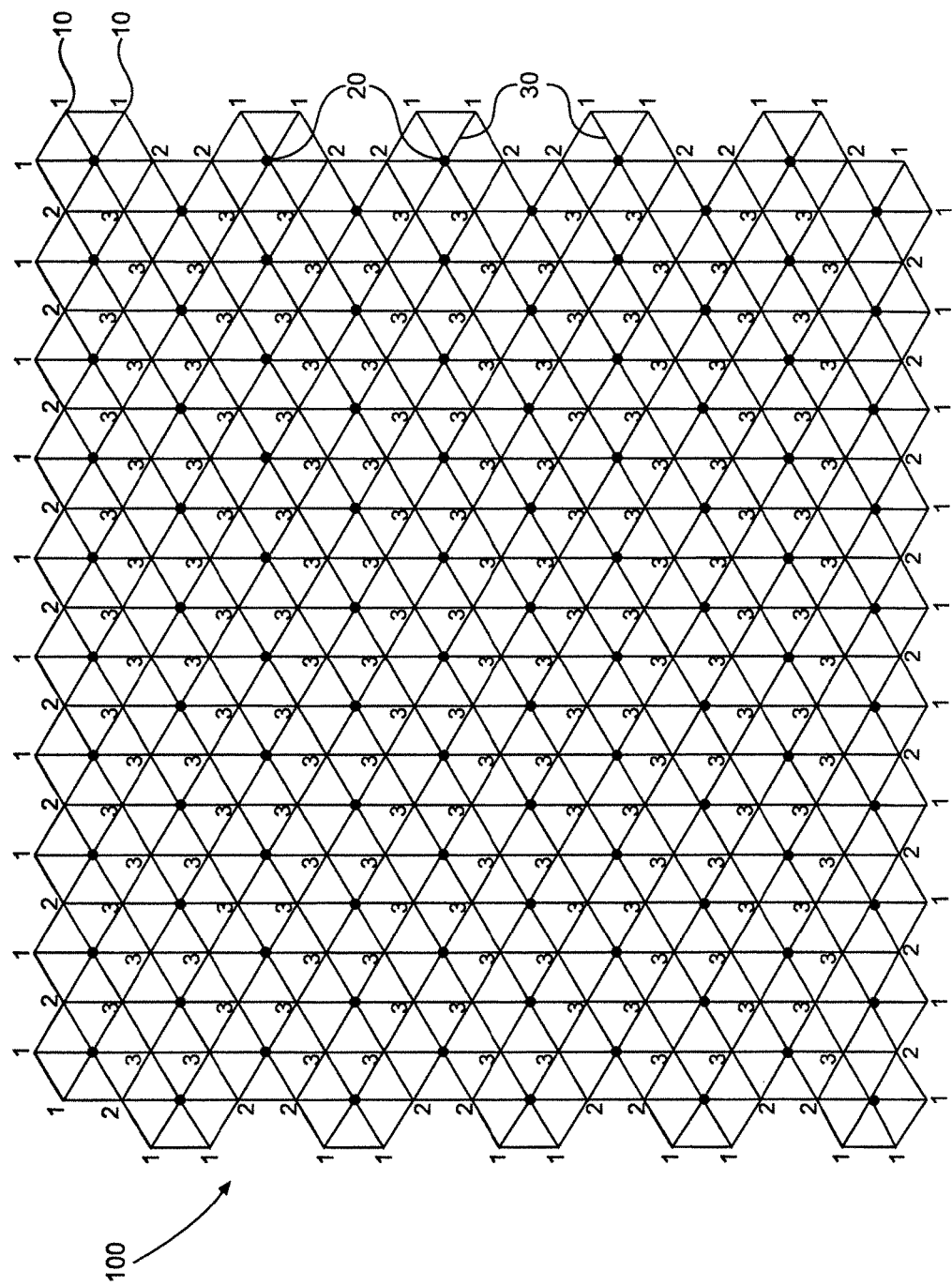
FIG. 1 shows a layout diagram of a first exemplary embodiment of a wind farm according to the invention having a particularly preferred design, in the top view.

FIG. 1 shows a layout diagram of a first exemplary embodiment of a wind farm according to the invention having a particularly preferred design, in the top view.

The wind farm 100 is made up of a plurality of floating wind power plants 20, each situated within a plurality of tiled hexagons, the corners of which are formed by foundation elements 10 that are introduced into the bed of the body of water.

The floating wind power plants 20 are connected to the foundation elements 10 via connecting means 30, which are made up of chains or cables or a combination of chains and cables.

In each case six foundation elements 10 form a hexagon, wherein due to the tiled arrangement, the foundation elements 10 form the corner of not just one hexagon, but, rather, the corner of two, or usually three, adjoining hexagons. The numbers provided at each of the foundation elements 10 indicate the number of hexagons, and thus at the same time, the number of wind power plants 20 connected to the particular foundation element 10.

Figure 2:
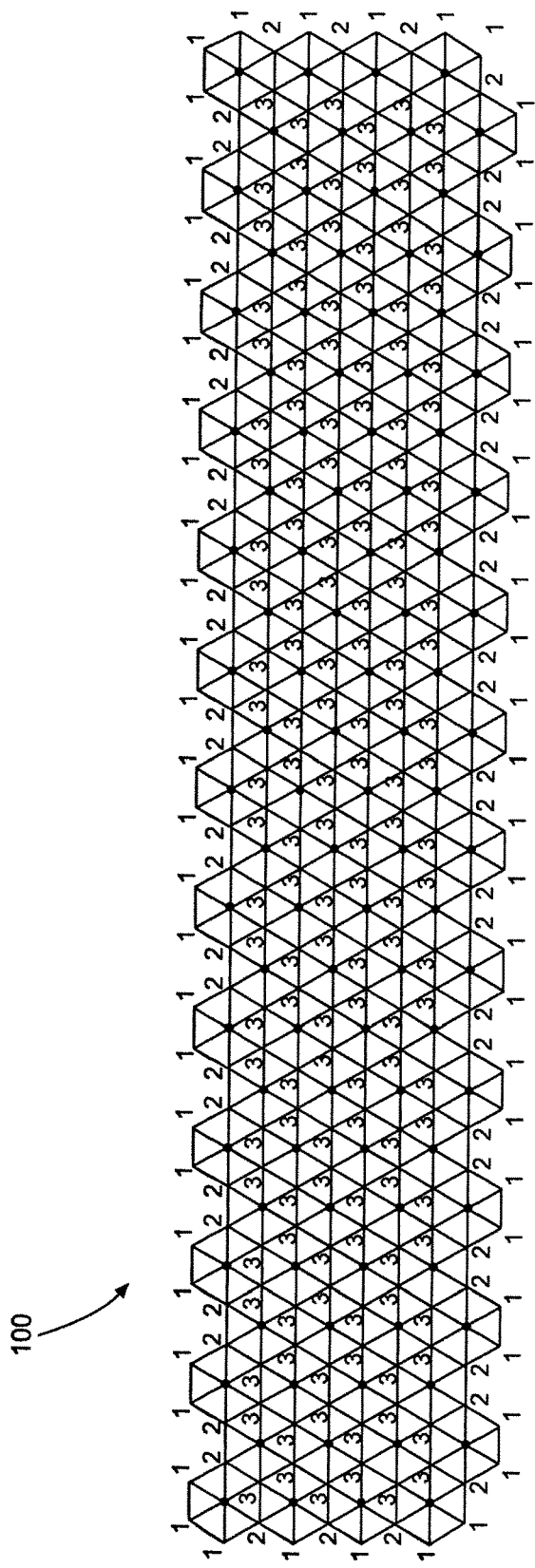
FIG. 2 shows a layout diagram of a second exemplary embodiment of a wind farm according to the invention having a particularly preferred design, in the top view.

FIG. 2 shows a layout diagram of a second exemplary embodiment of a wind farm according to the invention having a particularly preferred design, in the top view. In this layout diagram, in contrast to FIG. 1, an elongated configuration of the wind farm is achieved, wherein here as well, as the result of the tiled arrangement of the foundation elements 10 a significant savings of foundation material may be achieved compared to a solitary arrangement of offshore wind power plants in an array.

FIG. 3 shows a detail of a wind farm according to the invention with several adjacently arranged floating wind power plants in the starting position. In this position, the floating wind power plants 20 in the illustrated wind farm 100 are situated on the water surface in the midpoint of the hexagons, wherein all connecting means 30 that connect the wind power plants 20 to the foundation elements 10 sag.

FIG. 4 shows the detail of the wind farm from FIG. 3, under load with a wind direction from the left. Under these conditions, the wind power plants 20 drift to the right in the wind direction, so that the connecting means 30 situated to the left of the wind power plants 20 are tightened, and keep the wind power plants 20 from drifting further away. In contrast, the connecting means 30 situated to the right of the wind power plants 20 are slackened.

Figure 5:
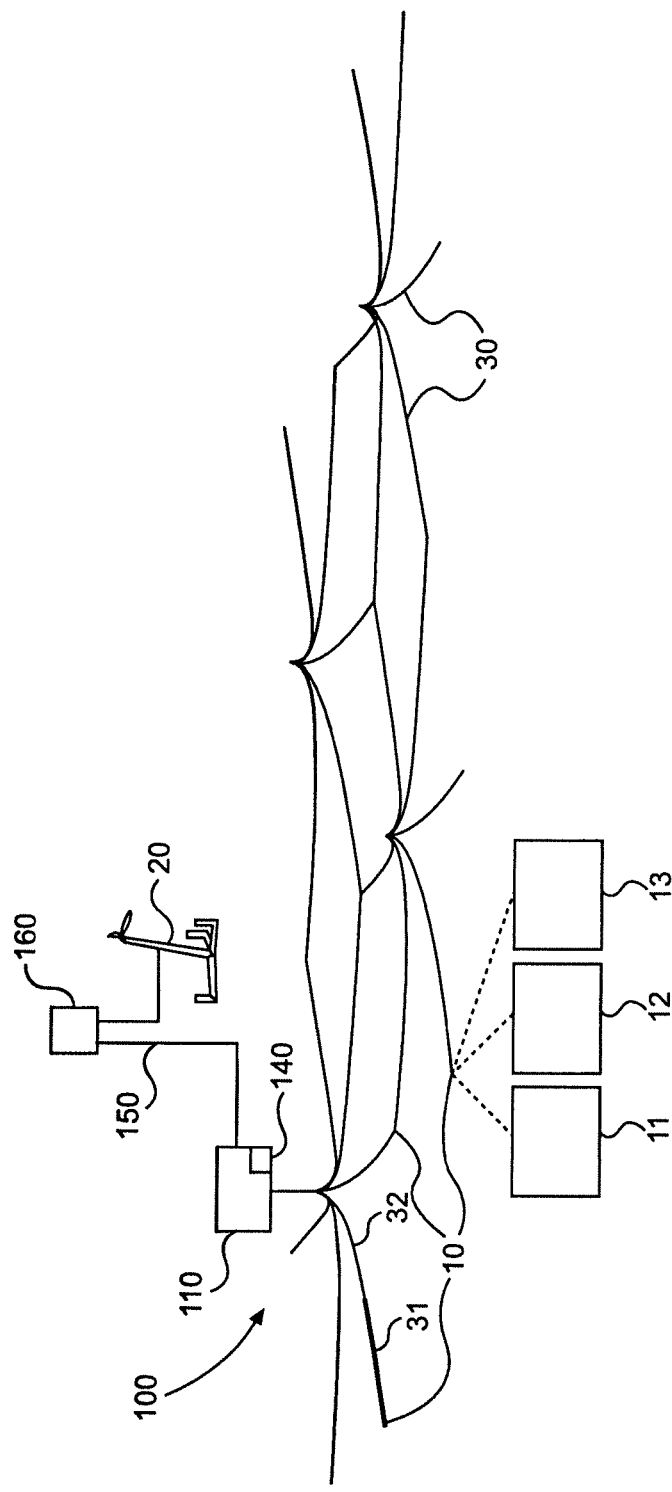
FIG. 5 shows the detail of the wind farm from FIG. 3, during setup.

FIG. 5 shows the method according to the invention for setting up an offshore wind farm provides the following steps: Introducing a plurality of foundation elements into the bed of a body of water in such a way that the foundation elements form the corners of a plurality of tiled hexagons; connecting the foundation elements, which in each case form a hexagon, to a shared buoy by means of a plurality of connecting means, which are formed in each case as chains and/or cables or a combination of chains and cables; and connecting the connecting means, fastened to the buoy, to a floating wind power plant.

If the buoy, as stated above, is designed as a mechanical coupling or has a coupling element for connection to the floating wind power plant, it is also possible to design the buoy as an electrical coupling for connecting the underwater cable to the electrical equipment of the wind power plant. The mechanical connection and the electrical connection may thus take place in one step.

The invention claimed is:

1. An offshore wind farm having
a plurality of foundation elements that are situated to form corners of a plurality of tiled hexagons, and
a plurality of floating offshore wind power plants, wherein in each case when one floating offshore wind power plant is situated at a midpoint of a respective one of the hexagons and is connected to the foundation elements forming the hexagon, the floating offshore wind power plants are connected to the foundation elements via untensioned sagging connectors designed as chains and/or cables or a combination of chains and cables, wherein each of the connectors has a length that allows drifting of each of the offshore wind power plants within a respective circular area having a radius of up to 10% of a hexagon circumradii about the midpoint.

2. The offshore wind farm according to claim 1, characterized in that the foundation elements are selected from the group of foundation elements comprising foundation piles, gravity foundations, and suction bucket foundations.

3. The offshore wind farm according to claim 1, characterized in that the connectors, designed as a combination of chains and cables, are connected with their chain portion to the foundation elements, and are connected with their cable portion to the floating offshore wind power plant.

4. A method for setting up an offshore wind farm comprising:
introducing a plurality of foundation elements into the bed of a body of water in such a way that the foundation elements form the corners of a plurality of tiled hexagons;
connecting the foundation elements, which in each case form a hexagon, to a shared buoy situated at a midpoint of the hexagon by a plurality of untensioned sagging connectors, which are formed in each case as chains and/or cables or a combination of chains and cables; and
connecting the connectors, fastened to the buoy, to a floating wind power plant.

5. The method according to claim 4, characterized in that the foundation elements are selected from the group of foundation elements comprising foundation piles, gravity foundations, and suction bucket foundations.

6. The method according to claim 5, characterized in that the introduction of the foundation elements takes place at a position that is predetermined by a positioning system.

7. The method according to claim 5, characterized in that the buoy has a coupling element for connection to the floating wind power plant.

8. The method according to claim 5, characterized by the following step: connecting the buoy or the floating wind power plant to an underwater cable.

9. The method according to claim 8, characterized in that the buoy has an electrical coupling for connecting the underwater cable to the electrical equipment of the wind power plant.

10. The method according to claim 4, characterized in that the introduction of the foundation elements takes place at a position that is predetermined by a positioning system.

11. The method according to claim 10, characterized in that the buoy has a coupling element for connection to the floating wind power plant.

12. The method according to claim 10, characterized by the following step: connecting the buoy or the floating wind power plant to an underwater cable.

13. The method according to claim 12, characterized in that the buoy has an electrical coupling for connecting the underwater cable to electrical equipment of the wind power plant.

14. The method according to claim 4, characterized in that the buoy has a coupling element for connection to the floating wind power plant.

15. The method according to claim 14, characterized by the following step: connecting the buoy or the floating wind power plant to an underwater cable.

16. The method according to claim 15, characterized in that the buoy has an electrical coupling for connecting the underwater cable to the electrical equipment of the wind power plant.

17. The method according to claim 4, characterized by the following step: connecting the buoy or the floating wind power plant to an underwater cable.

18. The method according to claim 17, characterized in that the buoy has an electrical coupling for connecting the underwater cable to the electrical equipment of the wind power plant.

19. The offshore wind farm according to claim 1, characterized in that the connectors, designed as a combination of chains and cables, are connected with their chain portion to the foundation elements, and are connected with their cable portion to the floating offshore wind power plant.

20. The offshore wind farm according to claim 1, characterized in that the foundation elements are suction bucket foundations.

* * * * *